United States Patent
He et al.

(10) Patent No.: US 11,732,056 B2
(45) Date of Patent: Aug. 22, 2023

(54) POLLEN POLYSACCHARIDE EXTRACT AND APPLICATION THEREOF IN PLANT GROWTH

(71) Applicant: CHENGDU NEWSUN CROP SCIENCE CO., LTD., Sichuan (CN)

(72) Inventors: Qiming He, Chengdu (CN); Shaojun Zhan, Chengdu (CN); Jin Huang, Chengdu (CN); Yuzhu Li, Chengdu (CN); Chuting Du, Chengdu (CN); Ke Liu, Chengdu (CN); Huihui Wang, Chengdu (CN); Huilin Li, Chengdu (CN); Yanling Wang, Chengdu (CN); Dan Wu, Chengdu (CN); Dan Huang, Chengdu (CN); Liangzhu Kang, Chengdu (CN); Linfeng Hang, Chengdu (CN); Hao Yin, Chengdu (CN)

(73) Assignee: CHENGDU NEWSUN CROP SCIENCE CO., LTD., Chengdu (CN)

( * ) Notice: Subject to any disclaimer, the term of this patent is extended or adjusted under 35 U.S.C. 154(b) by 0 days.

(21) Appl. No.: 17/794,010

(22) PCT Filed: Dec. 25, 2020

(86) PCT No.: PCT/CN2020/139228
§ 371 (c)(1),
(2) Date: Jul. 20, 2022

(87) PCT Pub. No.: WO2021/147609
PCT Pub. Date: Jul. 29, 2021

(65) Prior Publication Data
US 2023/0064585 A1 Mar. 2, 2023

(30) Foreign Application Priority Data

Jan. 20, 2020 (CN) .......................... 202010065021.7
Jan. 20, 2020 (CN) .......................... 202010065033.X

(51) Int. Cl.
*A01P 21/00* (2006.01)
*A01N 65/08* (2009.01)
*A01N 25/10* (2006.01)
*C08B 30/04* (2006.01)

(52) U.S. Cl.
CPC .............. *C08B 30/04* (2013.01); *A01N 65/08* (2013.01); *A01P 21/00* (2021.08)

(58) Field of Classification Search
None
See application file for complete search history.

(56) References Cited

U.S. PATENT DOCUMENTS

| 9,326,506 B2 * | 5/2016 | He ........................ A01N 43/22 |
| 2015/0005169 A1 | 1/2015 | He |

FOREIGN PATENT DOCUMENTS

| CN | 1098591 A | 2/1995 |
| CN | 105084996 A | 11/2015 |
| CN | 105326880 A | 2/2016 |
| CN | 105669875 A | 6/2016 |
| CN | 107047300 A | 8/2017 |
| CN | 108934851 A | 12/2018 |
| CN | 109006286 A | 12/2018 |
| CN | 109804852 A | 5/2019 |
| CN | 109819834 A | 5/2019 |

OTHER PUBLICATIONS

Mar. 31, 2021 International Search Report issued in International Patent Application No. PCT/CN2020/139228.
Xu, Xin et al.,"The optimization of purification process of total polysaccharides from *Arctium lappa* L. by chitosan flocculation," Science and Technology of Food Industry, vol. 40, No. 24, Dec. 31, 2019.
Yang, Xiao-ping et al., "Polysaccharide Extraction Study on Rape Pollen," vol. 25, No. 9, p. 128-131, 2004.
Wang, Jia et al., "Clarification effect of the astragalus aqueous extract with chitosan," Sichuan Institute of Chinese Materia Medica, vol. 22, No. 6, pp. 640-642, 2007.
Lui Xinghai; "Study on Regulating Effects of Plant Polysaccharide Compound Preparation on Crops Growth and Yield and Mechanism;" Agricultural Science and Technology, China Doctoral Dissertations/Master's Theses Full-Text Database (Master), 2011.
Li, Min; "Studies on Isolation, Purification, Structure and Function of Polysaccharides from Rape Pollen;" Wangfang Dissertations; pp. 44-49—Aug. 25, 2008.

* cited by examiner

*Primary Examiner* — John Pak
(74) *Attorney, Agent, or Firm* — Oliff PLC

(57) ABSTRACT

A pollen polysaccharide extract prepared by the following method: mixing rape pollen with water, then heating and stirring for extraction, filtering, mixing filtrates, adding chitosan to a resulting filtrate to obtain a liquid to be clarified, keeping the liquid to be clarified at 60-80° C. for at least 1 h, cooling and allowing to stand, and performing solid-liquid separation to obtain a liquid, namely the pollen polysaccharide extract.

13 Claims, 1 Drawing Sheet

POLLEN POLYSACCHARIDE EXTRACT AND APPLICATION THEREOF IN PLANT GROWTH

FIELD OF THE INVENTION

The invention relates to a pollen polysaccharide extract and an application thereof in plant growth, and belongs to the technical field of agriculture.

BACKGROUND OF THE INVENTION

In agricultural production, it is sometimes necessary to use growth promoters to promote plant growth, including promoting the growth of plant roots and the growth of stems and leaves that are above the ground. At present, brassinolide (BR) is widely used in the market as a safe growth promoter. Natural brassinolide is generally obtained from rape pollen by alcohol extraction, but its extraction rate is not high, resulting in high price of brassinolide. Nearly 40 brassinolide substances have been found, of which only four or five have high bioactivity and practical value. Although artificial synthesis has been achieved, the synthesis cost is also high.

The company has studied extraction processes for natural brassinolide for nearly 30 years, successfully developed a new environment-friendly process for extracting natural brassinolide from rape pollen, and has been granted with a domestic invention patent and an international PCT invention patent in the United States and Australia. The company has an original core technology in the extraction of natural brassinolide (14-hydroxylated brassinosteroid), and has a stable production line for 14-hydroxylated brassinosteroid, with an annual output of pure 14-hydroxylated brassinosteroid product of 500 kg. In a process of extracting natural brassinolide, a large amount of pollen polysaccharide will be produced. According to the invention, a by-product pollen polysaccharide produced in the process of extracting natural brassinolide has a good promoting effect on the growth of crops, and has a good promoting effect on roots, stems, leaves and the like of crops in a certain concentration range through foliage spray or root irrigation. In addition, the application of the pollen polysaccharide to crops can significantly enhance stress resistance of crops, and reduce damage caused by drought, saline-alkali, low temperature and other stresses to roots, leaves, flower buds, fruits and other organs of the crops, thereby reducing agricultural losses caused by extreme weather. According to a component test, the by-product contains saccharides, protein, amino acids, lipids and other components. Existing research reports on rape pollen polysaccharide are mostly in the fields of food and medicine, and researches in the agricultural field have not been reported yet.

SUMMARY OF THE INVENTION

A technical problem to be solved by the invention is to provide a pollen polysaccharide extract, which can be extracted at an extremely low cost and can promote plant growth.

The pollen polysaccharide extract according to the invention is prepared by the following method:

mixing rape pollen with water, then heating and stirring for extraction at least once, filtering, mixing filtrates, adding chitosan to a resulting filtrate to obtain a liquid to be clarified, keeping the liquid to be clarified at 60-80° C. for at least 1 h, cooling and allowing to stand, and performing solid-liquid separation to obtain a liquid, namely the pollen polysaccharide extract.

In an embodiment, the stirring is performed at a speed of 3000-4000 r/min at 60-70° C. for 3-5 h during each extraction.

As a preferred embodiment, the water is demineralized water.

In a specific embodiment, the rape pollen and the water are mixed at a weight ratio of 1:1.5-5 during each extraction. In a specific embodiment, the rape pollen and the water are mixed at a weight ratio of 1:2.

As one of the embodiments, heating and stirring are carried out for extraction twice.

In one embodiment of the invention, the chitosan in the liquid to be clarified has a concentration of 0.01-0.15 wt %. In a specific embodiment, the chitosan in the liquid to be clarified has a concentration of 0.05-0.1 wt %. In a specific embodiment, the chitosan in the liquid to be clarified has a concentration of 0.08 wt %.

In an embodiment of the invention, the liquid to be clarified is kept at 70° C. for 1 h.

A second technical problem to be solved by the invention is to provide a plant-derived biostimulant.

The plant-derived biostimulant according to the invention is prepared by concentrating the pollen polysaccharide extract and adding agronomically acceptable excipients.

The invention further provides an application of the pollen polysaccharide extract in agriculture.

The invention further provides an application of the pollen polysaccharide extract or the plant-derived biostimulant in promoting plant root growth.

In an embodiment of the invention, the pollen polysaccharide extract or the plant-derived biostimulant is applied to plant roots when in use.

In an embodiment of the invention, the plant is a vegetable, a fruit tree or a flower.

In a specific embodiment of the invention, the plant is wheat, lettuce, celery, citrus, kiwi fruit or tea tree.

The invention further provides an application of the pollen polysaccharide extract or the plant-derived biostimulant in promoting plant growth.

In an embodiment of the invention, the pollen polysaccharide extract or the plant-derived biostimulant is sprayed on plant leaves or applied to plant roots when in use.

In an embodiment of the invention, the plant is a vegetable or a fruit tree.

In a specific embodiment of the invention, the plant is baby Chinese cabbage, asparagus lettuce, lettuce, Chinese cabbage, citrus, kiwi fruit, cherry or apple.

The invention further provides an application of the pollen polysaccharide extract or the plant-derived biostimulant in plant stress resistance.

In an embodiment of the invention, the pollen polysaccharide extract is sprayed on plant leaves or applied to plant roots when in use.

In an embodiment of the invention, the plant is a vegetable or a fruit tree.

In a specific embodiment of the invention, the plant is wheat, pepper, tomato, citrus, kiwi fruit, cherry, pear or apple.

In an embodiment of the invention, the plant stress resistance is drought resistance, high temperature resistance, cold resistance or saline-alkali resistance.

Compared with the prior art, the invention has the following advantages:

1) According to the invention, a pollen polysaccharide extract is obtained by clarification after water extraction. The pollen polysaccharide extract has a good effect on promoting the growth of plant roots or stems and leaves, and a method for preparing the pollen polysaccharide extract is simple, safe and environment-friendly.

2) The pollen polysaccharide extract according to the invention can make full use of by-products from the production process of brassinolide, and turn waste into wealth with extremely low cost, and great environmental and economic benefits.

3) According to the invention, a pollen polysaccharide is used in the agricultural field for the first time, which expands the application field of the pollen polysaccharide and provides a new choice for plant-derived biostimulants.

4) The pollen polysaccharide extract according to the invention has the function of improving drought resistance, high temperature resistance, cold resistance or saline-alkali resistance of plants, expands the application field of the pollen polysaccharide, and provides a new choice for plant stress resistance.

DETAILED DESCRIPTION OF THE PREFERRED EMBODIMENTS

Figure 1:
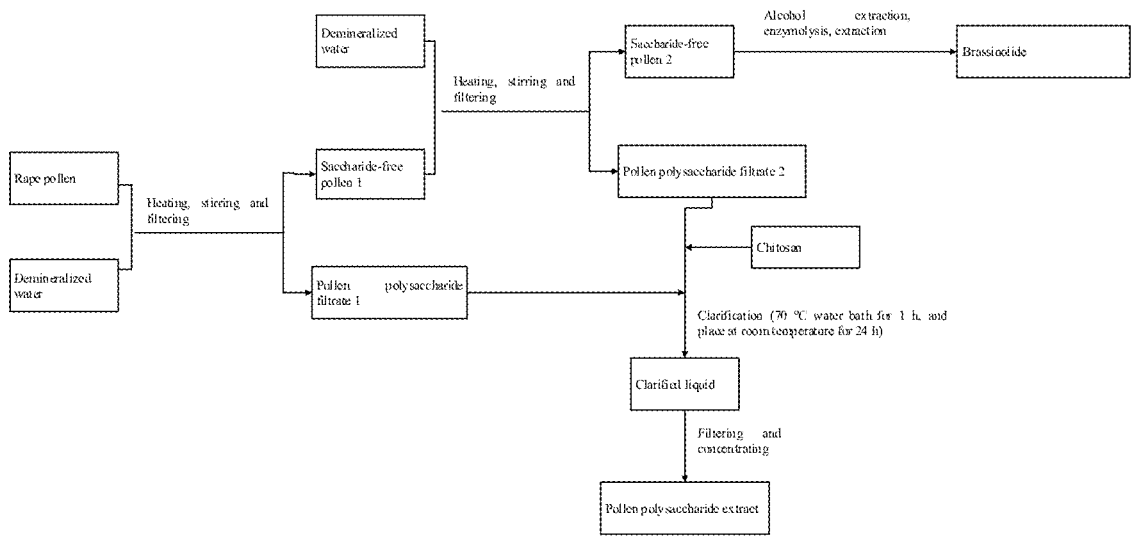
FIG. 1 shows an extraction process for a pollen polysaccharide according to Embodiment 1 of the invention.
Figure 2:
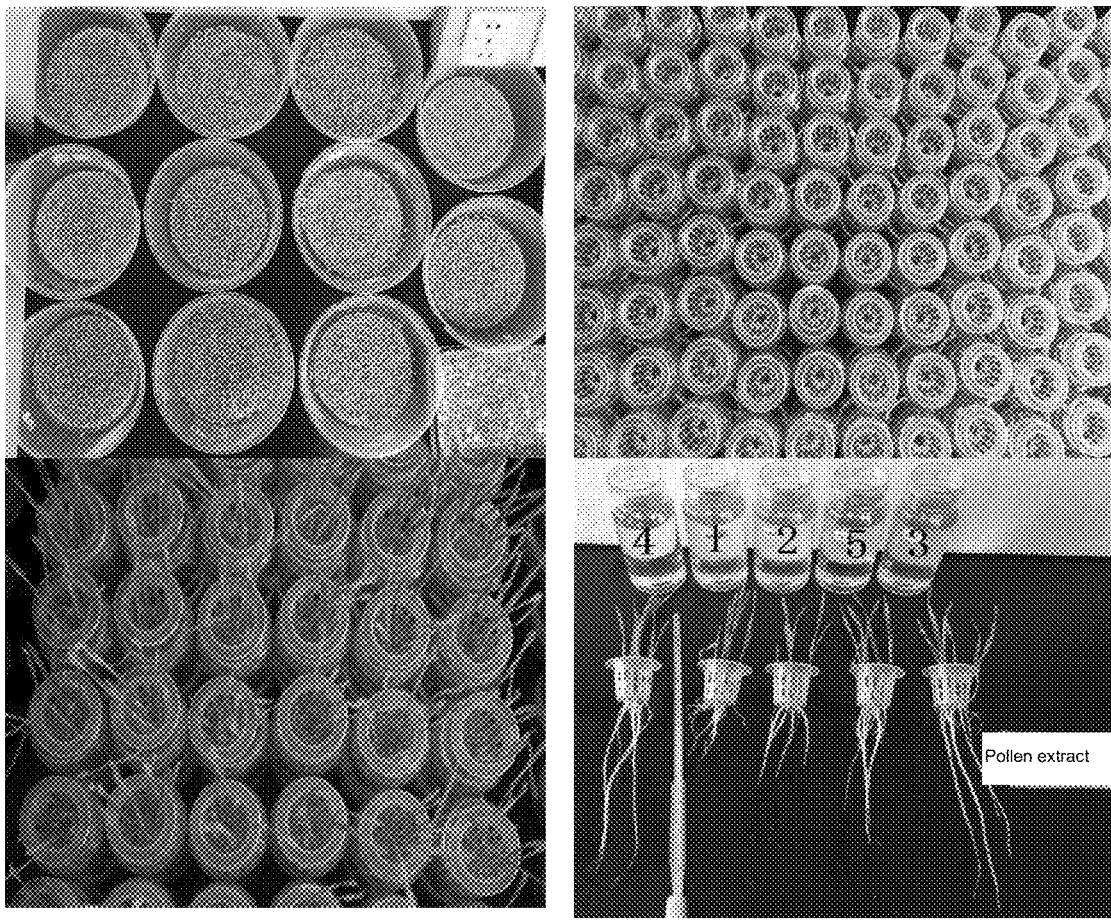
FIG. 2 shows photos of test procedures in Test Example 1 of the invention, in which the upper left shows a wheat pregermination and soaking procedure, the upper right shows a wheat germination and growth procedure (day 2), the lower left shows a wheat germination and growth procedure (day 8), and the lower right shows test investigation record.

The pollen polysaccharide extract according to the invention is prepared by the following method:

mixing rape pollen with water, then heating and stirring for extraction at least once, filtering, mixing filtrates, adding chitosan to a resulting filtrate to obtain a liquid to be clarified, keeping the liquid to be clarified at 60-80° C. for at least 1 h, cooling and allowing to stand, and performing solid-liquid separation to obtain a liquid, namely the pollen polysaccharide extract.

A method for extracting the pollen polysaccharide extract is simple without toxic organic reagents in the extraction process, which is safe, environment-friendly and low-cost. Moreover, the pollen polysaccharide extract comes from by-products in the extraction process of natural brassin, so that the cost is extremely low, and the effect of promoting the growth of roots, stems, leaves, etc. of crops is remarkable To break cell walls better and allow polysaccharides to be dissolved fully, in an embodiment of the invention, the stirring is performed at a speed of 3000-4000 r/min at 60-70° C. for 3-5 h during each extraction.

In an embodiment of the invention, the stirring time is 4 h.

In an embodiment of the invention, the water is demineralized water. Demineralized water refers to water with little or no soluble calcium and magnesium compounds. Usually, the content of calcium and magnesium ions in water is expressed by "hardness" index. A hardness of 1 degree is equivalent to 10 mg of calcium oxide per liter of water. Water below 8 degrees is called demineralized water. Demineralized water can be prepared by a conventional method in the art.

The pollen polysaccharide in rape pollen is soluble in water, therefore, water extraction is adopted in the invention. If the amount of water is too less, there will be the defect of low pollen polysaccharide extraction rate, and if the amount of water is too much, the later concentration cost will be higher. Therefore, preferably, the rape pollen and the water are mixed at a weight ratio of 1:1.5-5 during each extraction. As a preferred solution, the rape pollen and the water are mixed at a weight ratio of 1:2.

To extract the pollen polysaccharide from rape pollen as much as possible while taking into account the extraction efficiency, reducing the difficulty in removing impurities from the extraction process for natural brassin, and reducing energy consumption and cost, preferably, heating and stirring are carried out for extraction twice.

After extraction, filtrates are mixed, and then chitosan is added for clarification to remove impurities from the pollen polysaccharide. In one embodiment of the invention, the chitosan in the liquid to be clarified has a concentration of 0.01-0.15 wt %. In a specific embodiment of the invention, the chitosan in the liquid to be clarified has a concentration of 0.05-0.1 wt %. In a specific embodiment of the invention, the chitosan in the liquid to be clarified has a concentration of 0.08 wt %.

In an embodiment of the invention, the liquid to be clarified is kept at 70° C. for 1 h.

The plant-derived biostimulant according to the invention is prepared by concentrating the pollen polysaccharide extract and adding agronomically acceptable excipients.

The pollen polysaccharide extract can be prepared into various common dosage forms by conventional production methods in the field of preparation processing. For example, the pollen polysaccharide extract is concentrated, and then mixed with one or more excipients to prepare into aqueous solutions, soluble concentrates, powder, granules and other dosage forms as required.

The degree of concentration can be determined by those skilled in the art according to the amount of water added during extraction and the final demand of products.

To allow the products stable and convenient for transportation and storage, excipients need to be added to prepare into corresponding dosage forms. The agronomically acceptable excipients in the invention can be concentrated and prepared with the pollen polysaccharide extract to be applied to plants, or added with excipients to facilitate storage, transportation or use. The excipients can be conventional excipients in the art, such as dispersant, wetting agent, binder, emulsifier, stabilizer and solvent.

The invention provides an application of the pollen polysaccharide extract in agriculture. Different from the application of existing pollen polysaccharides in the fields of food and medicine, it is found for the first time in the invention that the pollen polysaccharide extract can be used in agriculture to promote the growth of plants.

The invention further provides an application of the pollen polysaccharide extract or the plant-derived biostimulant in promoting the growth of plant roots.

The pollen polysaccharide extract or the plant-derived biostimulant according to the invention can promote the growth of plant roots.

In an embodiment of the invention, the pollen polysaccharide extract or the plant-derived biostimulant is applied to plant roots when in use. The application concentration is calculated by the concentration of crude polysaccharides in the pollen polysaccharide extract or the plant-derived biostimulant, and the concentration is controlled at 0.3-1 ppm. It is advisable to use an amount that can make all the topsoil wet.

In a specific embodiment of the invention, the plant is a vegetable, a fruit tree or a flower. More preferably, the plant is wheat, lettuce, celery, citrus, kiwi fruit or tea tree.

The pollen polysaccharide extract or the plant-derived biostimulant according to the invention can promote the growth of plants, that is, the growth of aboveground parts of plants, including stems and leaves.

In an embodiment of the invention, the pollen polysaccharide extract or the plant-derived biostimulant is sprayed on plant leaves or applied to plant roots when in use. The application concentration is calculated by the concentration of crude polysaccharides in the pollen polysaccharide extract or the plant-derived biostimulant, and the concentration of the crude polysaccharides in the pollen polysaccharide extract or the plant-derived biostimulant is controlled at 0.75-12 ppm; preferably at 1.5-8 ppm; and more preferably at 3 ppm. The application amount is a conventional amount. For example, it is advisable to keep all leaves wet without dripping after spraying.

In a specific embodiment of the invention, the plant is a vegetable or a fruit tree. More preferably, the plant is baby Chinese cabbage, asparagus lettuce, lettuce, Chinese cabbage, citrus, kiwi fruit, cherry or apple.

The pollen polysaccharide extract or the plant-derived biostimulant according to the invention has the function of improving drought resistance, high temperature resistance, cold resistance or saline-alkali resistance of plants, and can be applied to plant stress resistance.

In an embodiment of the invention, the pollen polysaccharide extract is sprayed on plant leaves or applied to plant roots when in use. The application concentration is calculated by the concentration of crude polysaccharides in the pollen polysaccharide extract. The concentration of the crude polysaccharides in the pollen polysaccharide extract is controlled at 0.125-1 ppm when applied to roots, and controlled at 1-8 ppm when applied to leaves.

The application amount is a conventional amount. For example, it is advisable to keep all leaves wet without dripping after spraying. When applied to plant roots, it is advisable to use an amount that can make all the topsoil wet.

In a specific embodiment of the invention, the plant is a vegetable or a fruit tree. More preferably, the plant is wheat, pepper, tomato, citrus, kiwi fruit, cherry, pear or apple.

The following description will detail the specific embodiments of the present invention, and the invention will not be limited to the embodiments thereby.

Embodiment 1

Rape pollen and demineralized water are mixed at a weight ratio of 1:2, then heated and stirred for extraction twice, and the stirring is performed at a speed of 3500 r/min at 65° C. for 4 h during each extraction. After stirring, a resulting mixture is filtered to obtain a saccharide-free pollen 2, which is used to extract brassinolide. After filtrates (i.e., a pollen polysaccharide filtrate 1 and a pollen polysaccharide filtrate 2) are mixed, chitosan is added for clarification. The concentration of chitosan in the liquid to be clarified is controlled at 0.08%, and the liquid to be clarified is added into a 70° C. water bath for reaction for h. After allowing to stand at room temperature for 24 h, a supernatant is extracted as a clarified liquid. After filtration, the clarified liquid is concentrated under vacuum to ¼ of the weight of the liquid before concentration to obtain a pollen polysaccharide extract.

Components of the pollen polysaccharide extract are tested, and results are shown in Table 1.

TABLE 1

| Test items | Unit | Test methods | Test results | Limit of quantification |
|---|---|---|---|---|
| Crude polysaccharides | g/100 mL | Method for Testing Functional Components in Health Food (Version 1, 2002) Chapter 2 Method for Testing Functional Components in Health Food Method 1 | 2.26 | — |
| Fructose | g/100 g | GB 5009.8-2016 Method 1 | 10.0 | 0.2 |
| Dextrose | g/100 g | GB 5009.8-2016 Method 1 | 13.6 | 0.2 |
| Sucrose | g/100 g | GB 5009.8-2016 Method 1 | ND | 0.2 |
| Maltose | g/100 g | GB 5009.8-2016 Method 1 | ND | 0.2 |
| Lactose | g/100 g | GB 5009.8-2016 Method 1 | 0.26 | 0.2 |
| Total fat | g/100 g | GB 5009.168-2016 Method 1 | 0.09 | — |
| Proteins | g/100 g | GB 5009.5-2016 Method 1 | 11.4 | — |
| Total amino acids | % | GB 5009.124-2016 | 7.39 | 0.01 |
| Selenium (Se) | mg/kg | GB 5009.93-2017 Method 1 | ND | 0.006 |
| Phosphorus (P) | mg/100 g | GB 5009.87-2016 Method 1 | 194 | 60 |
| Vitamin A | μg/100 g | GB 5009.82-2016 Method 1 | ND | 30 |
| Vitamin C | mg/100 g | GB 5009.86-2016 Method 2 | ND | 0.7 |
| Brassin | mg/kg | Refer to enterprise standards Q/915101312143536291.4-2018 | ND | 0.0004 |

Note:
Total fat = saturated fat + monounsaturated fat + polyunsaturated fat + trans fat.
ND = not detected.

Test Example 1

In this test, the effect of the pollen polysaccharide extract obtained in Embodiment 1 on crop growth is mainly explored by wheat hydroponics, in which the concentration of the pollen polysaccharide extract is calculated by crude polysaccharides. Test procedures:

1. Wheat Pregermination:

① soaking wheat seeds in 5% sodium hypochlorite solution for sterilization for 10 min, and washing with water for 5-6 times to remove sodium hypochlorite;

② soaking the cleaned seeds in clean water for 6-8 h; and

③ spreading the soaked seeds in a 25° C. constant temperature incubator overnight to prevent overlapping of seeds and affecting germination.

2. Hydroponic Experiment:

① taking the pollen polysaccharide extract, and then diluting the pollen polysaccharide to different multiples for later use;

② selecting full wheat seeds with the same size, no diseases and insect pests, and the same degree of whitening, transplanting the wheat seeds into planting baskets, with 10 wheat seeds in each planting basket;

③ transplanting the planting baskets loaded with pregerminated wheat seeds into pollen polysaccharide solutions at different dilutions, making sure that the seeds just come into contact with the liquid surface, and setting three replicates for each pollen polysaccharide treatment at each concentration; and ④ setting a clean water control.

3. Test Through Investigation:

① taking photos of the whole appearance of wheat treated with different concentrations;

② observing the root length (the distance from the junction of roots and stems to root tip) and the total length of the plant (the distance from the base of the plant to the tip of the uppermost unfolded leaf);

③ rinsing plant samples repeatedly with distilled water and removing the moisture, then cutting the wheat from the junction of roots and stems, and measuring the weight of aboveground parts and underground parts respectively; and ④ putting these parts in an oven to deactivate enzymes at 105° C. for half an hour, then drying at 70° C. to a constant weight and measuring the dry weight.

4. Data Processing:

Inhibition rate/growth rate (%)=|root length or plant height after treatment-control root length or plant height|/control root length or plant height*100

See Tables 2 and 3 for the results of pollen polysaccharide treatment after 7 days.

TABLE 2

Test results

| No. | Groups | Root length/cm | Plant height/cm | Fresh weight of aboveground part/g | Fresh weight of underground part/g |
|---|---|---|---|---|---|
| 1 | Pollen polysaccharide extract (at a concentration of 10 ppm) | 5.2 | 7.8 | 0.42 | 0.48 |
| 2 | Pollen polysaccharide extract (at a concentration of 2 ppm) | 7.9 | 8.2 | 0.84 | 0.56 |
| 3 | Pollen polysaccharide extract (at a concentration of 0.2 ppm) | 18.2 | 15.9 | 1.38 | 0.95 |
| 4 | Pollen polysaccharide extract (at a concentration of 0.125 ppm) | 17.2 | 15.2 | 1.26 | 0.86 |
| 5 | Clean water treatment | 14.6 | 12.4 | 1.01 | 0.68 |

TABLE 3

Data analysis after the test

| No. | Groups | Root growth/ inhibition rate, % | Plant height growth/ inhibition rate, % | Growth/inhibition rate of aboveground fresh weight, % | Growth/inhibition rate of underground fresh weight, % | Remarks |
|---|---|---|---|---|---|---|
| 1 | Pollen polysaccharide extract (at a concentration of 10 ppm) | −64 | −37.1 | −58.42 | −29.41 | − |
| 2 | Pollen polysaccharide extract (at a concentration of 2 ppm) | −46 | −33.87 | −16.83 | −17.65 | − |
| 3 | Pollen polysaccharide extract | 25 | 28.23 | 36.63 | 39.71 | + |

TABLE 3-continued

Data analysis after the test

| No. | Groups | Root growth/ inhibition rate, % | Plant height growth/ inhibition rate, % | Growth/inhibition rate of aboveground fresh weight, % | Growth/inhibition rate of underground fresh weight, % | Remarks |
|---|---|---|---|---|---|---|
| | (at a concentration of 0.2 ppm) | | | | | |
| 4 | Pollen polysaccharide extract (at a concentration of 0.125 ppm) | 18 | 22.58 | 24.75 | 26.47 | + |
| 5 | Clean water treatment | / | / | / | / | |

(Note:
− represents inhibition,
+ represents promotion)

It is clear from Table 3 that the pollen polysaccharide extract according to the invention promotes root growth at a low concentration (0.125-0.2 ppm), and inhibits root growth at a high concentration (2-10 ppm). Based on experience in the art, the concentration for root irrigation is generally 3-5 times that for hydroponics. Therefore, the concentration of the pollen polysaccharide is preferably 0.3-1 ppm during root irrigation.

Embodiment 2

1. Material Required

Test: Bioactivity test on promoting the growth of stems and leaves of baby Chinese cabbage seedlings by the pollen polyacrylamide Subject: baby Chinese cabbage Commercially available baby Chinese cabbage seedlings (2-3 leaves) are purchased and transplanted, one in each pot, and seedlings with similar growth are selected for the test after recovery of growth.

2. Application Method

A total of 7 treatment groups are set up in this test, with 6 pots of baby Chinese cabbage seedlings for each treatment group. Before the test, the height of the aboveground part of each seedling and chlorophyll content (SPAD value) of new leaves are measured, and then a treating agent is sprayed according to the experimental design, and the amount of the treating agent is appropriate to wet the plants (about 3 mL/plant). The positive control treatment is sprayed with a seaweed extract at a concentration of 5000 times therecommended value (10% powder, supplied by the manufacturer Qingdao Haijingling Seaweed Biotechnology Group Co., Ltd. in April 2018), and the blank control is sprayed with the same amount of clean water. After application, all treatment groups are cultured under the same natural conditions.

3. Treating Agent Design

See Table 4 for test concentration settings.

TABLE 4

Test concentration settings

| No. | Sample | Concentration of diluted pollen polysaccharide |
|---|---|---|
| 1 | Pollen polysaccharide extract | 12 ppm |
| 2 | Pollen polysaccharide extract | 6 ppm |
| 3 | Pollen polysaccharide extract | 3 ppm |
| 4 | Pollen polysaccharide extract | 1.5 ppm |
| 5 | Pollen polysaccharide extract | 0.7 ppm |
| 6 | Seaweed extract | 20 ppm |
| 7 | Clean Water | — |

4. Investigation Method

Before the test, the height of the aboveground part of each seedling and SPAD values of new leaves are measured, and the treating agent is applied twice with an interval of 7 days. Investigation is performed one week after the second application, and the height of the aboveground part of the baby Chinese cabbage seedling and the SPAD value of the same leaf are measured. SPAD values are measured for three times, and the average value is recorded. The plant height growth rate, relative growth rate of plant height and SPAD value added before and after treatment are calculated.

Plant height growth rate=(plant height aftertreatment-plant height before treatment)*100%/plant height before treatment;

Relative growth rate=(growth rate of treated plant height-growth rate of blank plant height)*100%/growth rate of blank plant height.

After 14 days of application, measured results of indexes of the treatment groups are shown in Table 5 and Table 6, and all data in the tables are average values.

TABLE 5

Measured results of indexes of the treatment groups

| No. | Plant height before treatment (cm) | Plant height after treatment (cm) | SPAD before treatment | SPAD after treatment |
|---|---|---|---|---|
| 1 | 7.68 | 15.83 | 27.76 | 29.97 |
| 2 | 8.21 | 17.88 | 24.09 | 26.91 |
| 3 | 7.78 | 17.73 | 23.01 | 27.08 |
| 4 | 7.69 | 16.63 | 28.89 | 32.23 |
| 5 | 7.87 | 14.92 | 25.37 | 27.62 |
| 6 | 8.01 | 17.57 | 27.66 | 31.15 |
| 7 | 7.89 | 14.22 | 28.5 | 29.83 |

TABLE 6

Measured results of indexes of the treatment groups

| No. | Plant height growth rate (%) | Relative growth rate (%) | Change in chlorophyll |
|---|---|---|---|
| 1 | 106.12 | 32.27 | 2.21 |
| 2 | 117.78 | 46.80 | 2.82 |
| 3 | 127.89 | 59.40 | 4.07 |
| 4 | 116.25 | 44.90 | 3.34 |
| 5 | 89.58 | 11.65 | 2.25 |
| 6 | 119.35 | 48.76 | 3.49 |
| 7 | 80.23 | 0 | 1.33 |

SPAD can reflect the content of chlorophyll in leaves. The larger the SPAD value, the higher the chlorophyll content. According to the above data, the pollen polysaccharide in each treatment group can increase the SPAD value of plant leaves and promote the growth of aboveground parts of the plants. Among them, the relative growth rate of plant height of the aboveground part of baby Chinese cabbage seedlings sprayed with 3 ppm pollen polysaccharide on leaves is 59.40% and the SPAD value added is 4.07, which are obviously superior to the blank control with water and the positive control with seaweed extract.

In conclusion, foliage spray of 0.75-12 ppm pollen polysaccharide can promote the growth of baby Chinese cabbage seedlings, of which foliage spray of 3 ppm pollen polysaccharide has the best growth promoting effect.

Embodiment 3

1. Material Required

Test: Bioactivity test on promoting the growth of stems and leaves of asparagus lettuce seedlings by the pollen polysaccharide Subject: asparagus lettuce (Latin name: *Lactuca sativa* var. *angustata*) seedlings Commercially available asparagus lettuce seedlings (4-5 leaves) are purchased and transplanted, one in each pot, and seedlings with similar growth are selected for the test after recovery of growth.

2. Application Method

A total of 7 treatment groups are set up in this test, with 6 pots of asparagus lettuce seedlings for each treatment group. See Table 4 for details. Before the test, the height of the aboveground part of each seedling and SPAD values of new leaves are measured, and then a treating agent is sprayed according to the experimental design, and the amount of the treating agent is appropriate to wet the plants (about 3 mL/plant). The positive control treatment is sprayed with a seaweed extract at a concentration of 5000 times the recommended value (10% powder, supplied by the manufacturer Qingdao Haijingling Seaweed Biotechnology Group Co., Ltd. in April 2018), and the blank control is sprayed with the same amount of clean water. After application, all treatment groups are cultured under the same natural conditions.

3. Treating Agent Design

See Table 7 for test concentration settings.

TABLE 7

Test concentration settings

| No. | Sample | Concentration of diluted pollen polysaccharide |
|---|---|---|
| 1 | Pollen polysaccharide extract | 12 ppm |
| 2 | Pollen polysaccharide extract | 6 ppm |
| 3 | Pollen polysaccharide extract | 3 ppm |
| 4 | Pollen polysaccharide extract | 1.5 ppm |
| 5 | Pollen polysaccharide extract | 0.75 ppm |
| 6 | Seaweed extract | 20 ppm |
| 7 | Clean Water | — |

The concentration of the diluted pollen polysaccharide is calculated by crude polysaccharides.

4. Investigation Method

Before the test, the height of the aboveground part of each seedling and SPAD values of new leaves are measured, and the treating agent is applied twice with an interval of 7 days. Investigation is performed one week after the second application, and the height of the aboveground part of the asparagus lettuce seedling and the SPAD value of the same leaf are measured. SPAD values are measured for three times, and the average value is recorded. The plant height growth rate, relative growth rate of plant height and SPAD value added before and after treatment are calculated.

Plant height growth rate=(plant height after treatment-plant height before treatment)*100%/plant height before treatment;

Relative growth rate=(growth rate of treated plant height-growth rate of blank plant height)*100%/growth rate of blank plant height.

After 14 days of application, measured results of indexes of the treatment groups are shown in Table 8 and Table 9, and all data in the tables are average values.

TABLE 8

Measured results of indexes of the treatment groups

| No. | Plant height before treatment (cm) | Plant height after treatment (cm) | SPAD before treatment | SPAD after treatment |
|---|---|---|---|---|
| 1 | 11.14 | 21.50 | 17.69 | 19.81 |
| 2 | 10.88 | 21.94 | 16.82 | 19.12 |
| 3 | 11.07 | 23.85 | 20.09 | 23.93 |
| 4 | 10.94 | 22.34 | 19.31 | 21.82 |
| 5 | 11.37 | 22.45 | 18.66 | 20.91 |
| 6 | 10.56 | 22.41 | 19.20 | 22.81 |
| 7 | 11.23 | 19.87 | 18.82 | 19.98 |

TABLE 9

Measured results of indexes of the treatment groups

| No. | Plant height growth rate (%) | Relative growth rate (%) | Change in chlorophyll |
|---|---|---|---|
| 1 | 93.00 | 20.87 | 2.12 |
| 2 | 101.65 | 32.12 | 2.30 |
| 3 | 115.45 | 50.05 | 3.84 |
| 4 | 104.20 | 35.43 | 2.51 |
| 5 | 97.45 | 26.66 | 2.25 |
| 6 | 112.22 | 45.85 | 3.61 |
| 7 | 76.94 | 0.00 | 1.16 |

According to the above data, the pollen polysaccharide in each treatment group can increase the SPAD value of plant leaves and promote the growth of aboveground parts of the plants. Among them, the pollen polysaccharide at a concentration of 3 ppm has the best effect. After 14 days of spraying, the relative growth rate of plant height is 50.05%, and the SPAD value added is 3.84. The growth promoting effect is obviously superior to that of the blank control with water and the positive control with seaweed extract.

In conclusion, foliage spray of 0.75-12 ppm pollen polysaccharide can promote the growth of asparagus lettuce seedlings, of which 3 ppm pollen polysaccharide has the best effect.

Embodiment 4

1. Material Required

Test: Bioactivity test on promoting the growth of stems and leaves of lettuce seedlings by the pollen polysaccharide Subject: lettuce (Latin name: *Lactuca sativa* var. ramose Hort.) seedlings Commercially available lettuce seedlings (2-3 leaves) are purchased and transplanted, one in each pot, and seedlings with similar growth are selected for the test after recovery of growth.

2. Application Method

A total of 7 treatment groups are set up in this test, with 10 pots of lettuce seedlings for each treatment group. See Table 7 for details. Before the test, the height of the aboveground part of each seedling and SPAD values of new leaves are measured, and then a treating agent is sprayed according to the experimental design, and the amount of the treating agent is appropriate to wet the plants (about 3 mL/plant). The positive control treatment is sprayed with 10,000 times of amino acid (40% powder, supplied by the manufacturer Chengdu Aohe Biotechnology Co., Ltd. in April 2018), and the blank control is sprayed with the same amount of clean water. After application, all treatment groups are cultured in an incubator (at a temperature of 25° C. and a humidity of 50%).

3. Treating Agent Design

See Table 10 for test concentration settings.

TABLE 10

Test concentration settings

| No. | Sample | Concentration of diluted pollen polysaccharide |
|---|---|---|
| 1 | Pollen polysaccharide extract | 12 ppm |
| 2 | Pollen polysaccharide extract | 6 ppm |
| 3 | Pollen polysaccharide extract | 3 ppm |
| 4 | Pollen polysaccharide extract | 1.5 ppm |
| 5 | Pollen polysaccharide extract | 0.75 ppm |
| 6 | 40% compound amino acid powder | 40 ppm |
| 7 | Clean Water | — |

The concentration of the diluted pollen polysaccharide is calculated by crude polysaccharides.

4. Investigation Method

Before the test, the height of the aboveground part of each seedling and SPAD values of new leaves are measured, and the treating agent is applied twice with an interval of 7 days. Investigation is performed one week after the second application, and the height of the aboveground part of the lettuce seedling and the SPAD value of the same leaf are measured. SPAD values are measured for three times, and the average value is recorded. The plant height growth rate, relative growth rate of plant height and SPAD value added before and after treatment are calculated.

Plant height growth rate=(plant height after treatment-plant height before treatment)*100%/plant height before treatment;

Relative growth rate=(growth rate of treated plant height-growth rate of blank plant height)*100%/growth rate of blank plant height.

After 14 days of application, measured results of indexes of the treatment groups are shown in Table 11 and Table 12, and all data in the tables are average values.

TABLE 11

Measured results of indexes of the treatment groups

| No. | Plant height before treatment (cm) | Plant height after treatment (cm) | SPAD before treatment | SPAD after treatment |
|---|---|---|---|---|
| 1 | 6.54 | 11.74 | 15.42 | 17.04 |
| 2 | 6.52 | 12.12 | 16.73 | 18.52 |
| 3 | 6.83 | 13.39 | 15.29 | 18.93 |
| 4 | 6.99 | 12.47 | 15.02 | 17.81 |
| 5 | 5.94 | 10.28 | 13.29 | 15.13 |
| 6 | 6.78 | 12.99 | 14.29 | 16.39 |
| 7 | 6.72 | 10.46 | 15.25 | 16.15 |

TABLE 12

Measured results of indexes of the treatment groups

| No. | Plant height growth rate (%) | Relative growth rate (%) | Change in chlorophyll |
|---|---|---|---|
| 1 | 79.51 | 42.88 | 1.62 |
| 2 | 85.89 | 54.34 | 1.79 |
| 3 | 96.05 | 72.59 | 3.64 |
| 4 | 78.40 | 40.88 | 2.79 |
| 5 | 73.06 | 31.29 | 1.84 |
| 6 | 91.59 | 64.59 | 2.10 |
| 7 | 55.65 | 0.00 | 0.90 |

According to the above data, the pollen polysaccharide in each treatment group can increase the SPAD value of plant leaves and promote the growth of aboveground parts of the plants. Among them, the pollen polysaccharide at a concentration of 3 ppm has the best effect. After 14 days of spraying, the relative growth rate of plant height is 72.59%, the SPAD value added is 3.64, the relative growth rate of plant height in an amino acid treatment group is 64.59%, and the SPAD value added is 2.10. The growth promoting effect of the pollen polysaccharide is superior to that of the positive control group with amino acid.

In conclusion, foliage spray of 0.7-12 ppm pollen polysaccharide can promote the growth of lettuce seedlings, of which 3 ppm pollen polysaccharide has the best effect.

Embodiment 5

1. Material Required

Test: Bioactivity test on promoting the growth of stems and leaves of Chinese cabbage seedlings by the pollen polysaccharide Subject: Chinese cabbage (Latin name: *Brassica chinensis* L.) seedlings Commercially available Chinese cabbage seedlings (3-4 leaves) are purchased and transplanted, one in each pot, and seedlings with similar growth are selected for the test after recovery of growth.

2. Application Method

A total of 7 treatment groups are set up in this test, with 8 pots of Chinese cabbage seedlings for each treatment group. See Table 10 for details. Before the test, the height of the aboveground part of each seedling and SPAD values of new leaves are measured, and then a treating agent is sprayed according to the experimental design, and the amount of the treating agent is appropriate to wet the plants (about 3 mL/plant). The positive control treatment is sprayed with 10,000 times of amino acid (40% powder, supplied by the manufacturer Chengdu Aohe Biotechnology Co., Ltd. in April 2018), and the blank control is sprayed with the same amount of clean water. After application, all treatment groups are cultured in an incubator (at a temperature of 25° C. and a humidity of 50%).

3. Treating Agent Design

See Table 13 for test concentration settings.

TABLE 13

Test concentration settings

| No. | Sample | Concentration of diluted pollen polysaccharide |
| --- | --- | --- |
| 1 | Pollen polysaccharide extract | 12 ppm |
| 2 | Pollen polysaccharide extract | 6 ppm |
| 3 | Pollen polysaccharide extract | 3 ppm |
| 4 | Pollen polysaccharide extract | 1.5 ppm |
| 5 | Pollen polysaccharide extract | 0.75 ppm |
| 6 | 40% compound amino acid powder | 40 ppm |
| 7 | Clean Water | — |

The concentration of the diluted pollen polysaccharide is calculated by crude polysaccharides.

4. Investigation Method

Before the test, the height of the aboveground part of each seedling and SPAD values of new leaves are measured, and the treating agent is applied twice with an interval of 7 days. Investigation is performed one week after the second application, and the height of the aboveground part of the Chinese cabbage seedling and the SPAD value of the same leaf are measured. SPAD values are measured for three times, and the average value is recorded. The plant height growth rate, relative growth rate of plant height and SPAD value added before and after treatment are calculated.

Plant height growth rate=(plant height after treatment-plant height before treatment)*100%/plant height before treatment, Relative growth rate=(growth rate of treated plant height-growth rate of blank plant height)*100%/growth rate of blank plant height.

After 14 days of application, measured results of indexes of the treatment groups are shown in Table 14 and Table 15, and all data in the tables are average values.

TABLE 14

Measured results of indexes of the treatment groups

| No. | Plant height before treatment (cm) | Plant height after treatment (cm) | SPAD before treatment | SPAD after treatment |
| --- | --- | --- | --- | --- |
| 1 | 5.31 | 9.85 | 19.22 | 21.02 |
| 2 | 5.20 | 10.38 | 18.27 | 20.93 |
| 3 | 5.00 | 10.69 | 19.81 | 23.02 |
| 4 | 4.92 | 9.92 | 18.89 | 21.09 |
| 5 | 5.01 | 9.52 | 20.10 | 21.31 |
| 6 | 4.85 | 10.10 | 19.72 | 21.04 |
| 7 | 4.97 | 8.39 | 18.31 | 19.11 |

TABLE 15

Measured results of indexes of the treatment groups

| No. | Plant height growth rate (%) | Relative growth rate (%) | Change in chlorophyll |
| --- | --- | --- | --- |
| 1 | 85.50 | 24.25 | 1.80 |
| 2 | 99.62 | 44.77 | 2.66 |
| 3 | 113.80 | 65.38 | 3.21 |
| 4 | 101.63 | 47.69 | 2.20 |
| 5 | 90.02 | 30.82 | 1.21 |
| 6 | 108.25 | 57.31 | 1.32 |
| 7 | 68.81 | 0.00 | 0.80 |

According to the above data, the pollen polysaccharide in each treatment group can increase the SPAD value of plant leaves and promote the growth of aboveground parts of the plants. Among them, the pollen polysaccharide at a concentration of 3 ppm has the best effect. After 14 days of spraying, the relative growth rate of plant height is 65.38%, the SPAD value added is 3.21, the relative growth rate of plant height in the amino acid treatment group is 57.31%, and the SPAD value added is 1.32. The growth promoting effect of the pollen polysaccharide is superior to that of the control group with amino acid.

In conclusion, foliage spray of 0.75-12 ppm pollen polysaccharide can promote the growth of Chinese cabbage seedlings, of which 3 ppm pollen polysaccharide has the best effect.

Embodiment 6

1. Material Required

Test: Bioactivity test on improving drought resistance of wheat by the pollen polysaccharide Subject: Wheat (Yunong 495)

Wheat seeds are sterilized with 5% sodium hypochlorite for 10 min, then cleaned with water for 5-6 times to wash off sodium hypochlorite solution, and the cleaned wheat seeds are soaked overnight for 12 h. A filter paper is placed in a germination box added with a small amount of water to wet the filter paper, and seeds are spread on the filter paper. Then the germination box is placed in an artificial climate box for pregermination away from light at 25° C. for 1 day, and full wheat seeds with the same size, no diseases and insect pests, and the same degree of whitening are selected and transferred to hydroponic bottles, with bottle necks put in planting baskets and 10 wheat seeds in each planting basket, for hydroponic culture for 3 days for the test.

2. Application Method

A 20% PEG solution is prepared, 200 ml of the prepared PEG solution is added to each hydroponic bottle, different amount of treating agent is added according to concentration design of the treating agent, and after mixing well, wheat is put into the hydroponic bottles, with three replicates for each treatment. Meanwhile, a 20% PEG solution and clean water are used as blank controls, and a compound amino acid powder (40% powder, supplied by Chengdu Aohe Biotechnology Co., Ltd. in April 2019) and 14-hydroxylated brassinosteroid (Chengdu Newsun Crop Science Co., Ltd., 20190608) are used as positive controls, with 3 replicates for each group.

3. See Table 16 for treating agent design.

TABLE 16

Test concentration settings

| No. | Sample | Concentration of diluted pollen polysaccharide |
|---|---|---|
| 1 | Pollen polysaccharide extract | 1 ppm |
| 2 | Pollen polysaccharide extract | 0.5 ppm |
| 3 | Pollen polysaccharide extract | 0.25 ppm |
| 4 | Pollen polysaccharide extract | 0.125 ppm |
| 5 | 0.0075% 14-hydroxylated brassinosteroid aqueous solution | 0.01 ppm |
| 6 | 40% compound amino acid powder | 20 ppm |
| 7 | 20% PEG solution | — |
| 8 | Clean Water | — |

The concentration of the pollen polysaccharide is calculated by the concentration of crude polysaccharides.

4. Investigation Method

The root length, plant height, fresh root weight and fresh weight of aboveground parts of wheat are investigated six days later. Results are shown in Table 17, and all data in the table are averages.

TABLE 17

Measured results of indexes of the treatment groups

| No. | Root length (cm) | Plant height (cm) | Fresh root weight (g) | Fresh weight of aboveground parts (g) |
|---|---|---|---|---|
| 1 | 10.7 | 11.8 | 0.80 | 1.07 |
| 2 | 12.1 | 12.0 | 0.94 | 1.11 |
| 3 | 11.5 | 12.1 | 0.89 | 1.13 |
| 4 | 11.2 | 11.8 | 0.81 | 1.08 |
| 5 | 11.8 | 12.2 | 0.83 | 1.12 |
| 6 | 10.7 | 11.9 | 0.86 | 1.10 |
| 7 | 10.3 | 11.5 | 0.79 | 1.02 |
| 8 | 17.2 | 14.6 | 1.06 | 1.45 |

According to the above data, under the drought stress simulated by PEG, the root length and plant height of treatment 7 (PEG stress) are obviously inhibited compared with those of treatment 8 (clean water), and drought stress and damage to all treatment groups are alleviated after the pollen polysaccharide at different concentrations is applied. Among them, 0.5 ppm pollen polysaccharide has the best effect on alleviating drought stress, which is similar to 0.01 ppm 14-hydroxylated brassinosteroid, and significantly superior to the positive control with amino acid.

In conclusion, 0.125-1 ppm pollen polysaccharide can promote root length and plant height of wheat under drought stress, increase fresh root weight and fresh weight of aboveground part, and alleviate damage to wheat under drought stress. Under the above experimental conditions, 0.5 ppm pollen polysaccharide has the best effect.

Embodiment 7

1. Material Required

Test: Bioactivity test on improving saline-alkali resistance of wheat by the pollen polysaccharide Subject: Wheat (Yunong 495)

Wheat seeds are sterilized with 5% sodium hypochlorite for 10 min, then cleaned with water for 5-6 times to wash off sodium hypochlorite solution, and the cleaned wheat seeds are soaked overnight for 12 h. A filter paper is placed in a germination box added with a small amount of water to wet the filter paper, and seeds are spread on the filter paper. Then the germination box is placed in an artificial climate box for pregermination away from light at 25° C. for 1 day, and full wheat seeds with the same size, no diseases and insect pests, and the same degree of whitening are selected and transferred to hydroponic bottles, with bottle necks put in planting baskets and 10 wheat seeds in each planting basket, for hydroponic culture for 3 days for the test.

2. Application Method

A saline-alkali stress solution (0.12% sodium chloride and 0.1% sodium carbonate) is prepared, 200 ml of the prepared saline-alkali solution is added to each hydroponic bottle, different amount of treating agent is added according to concentration design of the treating agent, and after mixing well, wheat is put into the hydroponic bottles, with three replicates for each treatment. Meanwhile, a saline-alkali solution and clean water are used as blank controls, and a compound amino acid powder (40% powder, supplied by Chengdu Aohe Biotechnology Co., Ltd. in April 2019) and 14-hydroxylated brassinosteroid (Chengdu Newsun Crop Science Co., Ltd., 20190608) are used as positive controls, with 3 replicates for each group.

3. See Table 18 for treating agent design.

TABLE 18

Test concentration settings

| No. | Sample | Concentration of diluted pollen polysaccharide |
|---|---|---|
| 1 | Pollen polysaccharide extract | 1 ppm |
| 2 | Pollen polysaccharide extract | 0.5 ppm |
| 3 | Pollen polysaccharide extract | 0.25 ppm |
| 4 | Pollen polysaccharide extract | 0.125 ppm |
| 5 | 0.0075% 14-hydroxylated brassinosteroid aqueous solution | 0.01 ppm |
| 6 | 40% compound amino acid powder | 20 ppm |
| 7 | 20% PEG solution | — |
| 8 | Clean Water | |

The concentration of the pollen polysaccharide is calculated by the concentration of crude polysaccharides.

4. Investigation Method

The root length, plant height, fresh root weight and fresh weight of aboveground parts of wheat are investigated six days later. Results are shown in Table 19, and all data in the table are averages.

TABLE 19

Measured results of indexes of the treatment groups

| No. | Root length (cm) | Plant height (cm) | Fresh root weight (g) | Fresh weight of aboveground parts (g) |
|---|---|---|---|---|
| 1 | 9.7 | 6.9 | 0.81 | 1.16 |
| 2 | 10.2 | 7.3 | 0.89 | 1.23 |
| 3 | 9.5 | 6.6 | 0.80 | 1.09 |
| 4 | 8.9 | 6.0 | 0.72 | 1.05 |
| 5 | 10.4 | 7.6 | 0.87 | 1.24 |
| 6 | 8.7 | 5.9 | 0.74 | 1.02 |
| 7 | 7.4 | 5.5 | 0.65 | 0.93 |
| 8 | 16.3 | 13.4 | 1.17 | 1.35 |

According to the above data, under stress of the saline-alkali solution, root length and plant height of wheat are obviously inhibited, and stress to all treatment groups are alleviated after the pollen polysaccharide at different concentrations is applied. Among them, 0.5 ppm pollen polysaccharide has the best effect on alleviating saline-alkali stress, which is similar to 0.01 ppm 14-hydroxylated brassinosteroid, and significantly superior to the positive control with amino acid.

In conclusion, 0.125-1 ppm pollen polysaccharide can promote root length and plant height of wheat under saline-alkali stress, increase fresh root weight and fresh weight of aboveground part, and alleviate damage to wheat under saline-alkali stress. Under the above experimental conditions, 0.5 ppm pollen polysaccharide has the best effect.

Embodiment 8

1. Material Required

Test: Bioactivity test on improving drought resistance of pepper seedlings by the pollen polysaccharide Subject: Pepper seedlings Pepper seeds are sown in AOS, and seedlings with 4 leaves are transplanted into nursery pots for the test after recovery, with 1 plant in each pot. Pepper seedlings with similar growth are selected and watered uniformly to wet the soil thoroughly, and no watering is carried out thereafter.

2. Application Method

In this test, 6 treatment groups (a blank control and a positive control) are set up, with 6 plants for each treatment. When potting soil is dry, a treating agent is sprayed over the seedlings according to different settings, and the amount of the treating agent is appropriate to wet the plants (about 3 mL/plant). The positive control treatment is sprayed with 80 ppm compound amino acid powder (40% powder, supplied by Chengdu Aohe Biotechnology Co., Ltd. in April 2019) and 0.1 ppm 14-hydroxylated brassinosteroid (Chengdu Newsun Crop Science Co., Ltd., 20190608), and the blank control is sprayed with the same amount of clean water. During the treatment, the groups are not watered until there is drought stress.

3. See Table 20 for treating agent design.

TABLE 20

Test concentration settings

| No. | Sample | Concentration of diluted pollen polysaccharide |
|---|---|---|
| 1 | Pollen polysaccharide extract | 1 ppm |
| 2 | Pollen polysaccharide extract | 2 ppm |
| 3 | Pollen polysaccharide extract | 4 ppm |
| 4 | Pollen polysaccharide extract | 8 ppm |
| 5 | 0.0075% 14-hydroxylated brassinosteroid aqueous solution | 0.1 ppm |
| 6 | 40% compound amino acid powder | 80 ppm |
| 7 | Clean Water | — |

The concentration of the pollen polysaccharide is calculated by the concentration of crude polysaccharides.

4. Investigation Method

An investigation is carried out when stress occurs in each treatment group. In this test, an obvious drought condition develops 11 days after application of the treating agent. Damage index of pepper seedlings is investigated, and results are shown in Table 22. The proline content of the seedlings is measured by sampling, and results are shown in Table 23.

Damage index=$(1*S1+2*S2+3*S3+4*S4+5*S5)$/total number of plants under drought stress S n is the number of seedlings at the corresponding damage level See Table 21 for damage grading criteria.

TABLE 21

Damage grading criteria

| Level | Symptoms |
|---|---|
| 0 | The seedling grows well without any symptoms |
| 1 | The plant stands upright, and less than 20% of the leaves are wilting |
| 2 | The plant stands upright, and less than 50% of the leaves are waiting |
| 3 | The plant stands upright, and more than 50% of the leaves are wilting |
| 4 | The plant cannot stand upright, and all leaves are wilting |
| 5 | The whole seedling dies. |

TABLE 22

Damage degree of different treatment groups

| No. | Damage level per plant | | | | | | Damage index |
| --- | --- | --- | --- | --- | --- | --- | --- |
|  | Plant 1 | Plant 2 | Plant 3 | Plant 4 | Plant 5 | Plant 6 |  |
| 1 | 2 | 3 | 3 | 2 | 2 | 2 | 2.33 |
| 2 | 2 | 2 | 3 | 3 | 1 | 1 | 2.00 |
| 3 | 3 | 2 | 1 | 3 | 3 | 3 | 2.50 |
| 4 | 3 | 3 | 4 | 3 | 3 | 4 | 3.33 |
| 5 | 3 | 3 | 2 | 2 | 1 | 2 | 2.17 |
| 6 | 2 | 4 | 3 | 3 | 4 | 3 | 3.17 |
| 7 | 5 | 4 | 5 | 3 | 4 | 3 | 4.00 |

TABLE 23

Proline content of the treatment groups

| No. | Proline content (%) | Proline increment (%) |
| --- | --- | --- |
| 1 | 0.073 | 0.012 |
| 2 | 0.074 | 0.013 |
| 3 | 0.069 | 0.008 |
| 4 | 0.065 | 0.004 |
| 5 | 0.072 | 0.011 |
| 6 | 0.064 | 0.003 |
| 7 | 0.061 | 0 |

It is clear from the results in Table 22 that under drought stress, the spray of 1-8 ppm exogenous pollen polysaccharide can alleviate the damage degree of pepper seedlings, of which 2 ppm pollen polysaccharide has the best effect, the damage index of seedlings is 2.00, the effect is slightly superior to that of 14-hydroxylated brassinosteroid (2.17), obviously superior to that of the control with clean water (4.00) and the positive control with amino acid (3.17). It is clear from Table 23 that the spray of 1-8 ppm exogenous pollen polysaccharide can increase the proline content of pepper seedlings, and the concentration of the pollen polysaccharide in the treatment group with the maximum proline increment is 2 ppm, which is corresponding to the damage degree of the pepper seedlings, that is, the higher the proline content, the lower the damage degree of the seedlings.

In conclusion, foliage spray of 1-8 ppm pollen polysaccharide before drought can increase the accumulation of proline in pepper seedlings, thereby improving drought resistance of the plants, of which 2 ppm pollen polysaccharide has the best effect.

Embodiment 9

1. Material Required

Test: Bioactivity test on improving high temperature resistance of soybean seedlings by the pollen polysaccharide
Subject: soybean seedlings Soybean seeds are sown in AOS culture tanks in advance to raise seedlings. When two main leaves grow, soybean seedlings with the same growth are selected and transplanted into nursery cups. When three compound leaves grow from internodes, the seedlings are used for the test.

2. Application Method

In this test, 6 treatment groups (a blank control and a positive control) are set up, with 6 plants for each treatment. A treating agent is sprayed over the seedlings according to different settings, and the amount of the treating agent is appropriate to wet the plants (about 3 mL/plant). The positive control treatment is sprayed with 80 ppm compound amino acid powder (40% powder, supplied by Chengdu Aohe Biotechnology Co., Ltd. in April 2019) and 0.1 ppm 14-hydroxylated brassinosteroid (Chengdu Newsun Crop Science Co., Ltd., 20190608), and the blank control is sprayed with the same amount of clean water. The SPAD value of leaves is measured before treatment, then the seedlings are rejuvenated at room temperature for 1 day after spray, and put into an artificial climate box 1 day later for treatment at a high temperature of 40° C.

3. See Table 24 for treating agent design.

TABLE 24

Test concentration settings

| No. | Sample | Concentration of diluted pollen polysaccharide |
| --- | --- | --- |
| 1 | Pollen polysaccharide extract | 1 ppm |
| 2 | Pollen polysaccharide extract | 2 ppm |
| 3 | Pollen polysaccharide extract | 4 ppm |
| 4 | Pollen polysaccharide extract | 8 ppm |
| 5 | 0.0075% 14-hydroxylated brassinosteroid aqueous solution | 0.1 ppm |
| 6 | 40% compound amino acid powder | 80 ppm |
| 7 | Clean Water | — |

The concentration of the pollen polysaccharide is calculated by the concentration of crude polysaccharides.

4. Investigation Method

The SPAD values of leaves are measured when there are differences among the treatments, the heat damage level is investigated, and photos are taken as record. The heat damage grading criteria are shown in Table 25. This test shows significant differences after treatment at a high temperature for 3 days. The findings from the treatment groups are shown in Table 26 and Table 27. The values in Table 26 are average values.

Damage index=$(1*S1+2*S2+3*S3+4*S4+5*S5)$/total number of plants under high temperature stress S n is the number of seedlings at the corresponding heat damage level

TABLE 25

Heat damage grading criteria

| Level | Symptoms |
| --- | --- |
| 0 | The seedling grows well without any symptoms |
| 1 | The plant stands upright, and a few leaves turn yellow, with a yellowing area less than 20% |
| 2 | The plant stands upright, and most leaves turn yellow, with a yellowing area of 80%. |
| 3 | All leaves of the seedling turn yellow. |
| 4 | The upper parts of the seedling die. |
| 5 | The whole seedling dies. |

TABLE 26

SPAD values before and after high temperature stress in different treatment groups

| No. | SPAD value before high temperature | SPAD value after high temperature | SPAD decrement |
| --- | --- | --- | --- |
| 1 | 32.3 | 25.7 | 6.6 |
| 2 | 33.2 | 28.8 | 4.4 |
| 3 | 31.7 | 26.5 | 5.2 |
| 4 | 32.5 | 25.7 | 6.8 |
| 5 | 33.9 | 29.8 | 4.1 |

TABLE 26-continued

SPAD values before and after high temperature stress in different treatment groups

| No. | SPAD value before high temperature | SPAD value after high temperature | SPAD decrement |
|---|---|---|---|
| 6 | 31.4 | 23.3 | 8.1 |
| 7 | 32.8 | 24.6 | 8.2 |

TABLE 27

Damage degree of different treatment groups

| No. | Plant 1 | Plant 2 | Plant 3 | Plant 4 | Plant 5 | Plant 6 | Damage index |
|---|---|---|---|---|---|---|---|
| 1 | 3 | 3 | 3 | 2 | 2 | 3 | 2.67 |
| 2 | 2 | 1 | 3 | 3 | 2 | 2 | 2.17 |
| 3 | 3 | 3 | 2 | 3 | 3 | 3 | 2.83 |
| 4 | 3 | 3 | 4 | 3 | 2 | 4 | 3.17 |
| 5 | 2 | 3 | 2 | 2 | 1 | 2 | 2.00 |
| 6 | 3 | 4 | 5 | 4 | 3 | 3 | 3.67 |
| 7 | 4 | 4 | 5 | 3 | 4 | 3 | 3.83 |

It is clear from the results in Table 26 that under high temperature stress, the spray of 1-8 ppm exogenous pollen polysaccharide can slow down the decrease in chlorophyll content of soybean seedlings, thereby improving high temperature resistance of the seedlings, of which 2 ppm pollen polysaccharide has the best effect, with a decrease in SPAD of 4.4, and the decrease in SPAD of the positive controls with 14-hydroxylated brassinosteroid, the compound amino acid powder and the control with clean water is 4.1, 8.1 and 8 respectively.

According to Table 27, it can be seen from phenotypes of the seedlings that the spray of 1-8 ppm exogenous pollen polysaccharide can reduce the damage index of the soybean seedlings, of which 2 ppm pollen polysaccharide has the best effect.

In conclusion, foliage spray of 1-8 ppm pollen polysaccharide before high temperature can reduce the damage index of soybean seedlings by slowing down the decrease in SPAD value in a high temperature environment, of which 2 ppm pollen polysaccharide has the best effect.

Embodiment 10

1. Material Required
Test: Bioactivity test on improving cold resistance of citrus by the pollen polysaccharide
Subjects: citrus, Ai Yuan 38
Citrus trees for this test are adult trees, with a planting density of about 80 trees/666.66 m². The experimental site is located in Pujiang County, Chengdu.

2. Application Method
Citrus trees with similar growth and fruit bearing capacity are selected as test materials. The whole plants are sprayed according to different settings until all leaves and fruits are wet without dripping, with one citrus tree for each treatment. Citrus fruits in the treatments are not bagged.

3. See Table 28 for treating agent design.

TABLE 28

Test concentration settings

| No. | Sample | Concentration of diluted pollen polysaccharide |
|---|---|---|
| 1 | Pollen polysaccharide extract | 1 ppm |
| 2 | Pollen polysaccharide extract | 2 ppm |
| 3 | Pollen polysaccharide extract | 4 ppm |
| 4 | Pollen polysaccharide extract | 8 ppm |
| 5 | 0.0075% 14-hydroxylated brassinosteroid aqueous solution | 0.1 ppm |
| 6 | 40% compound amino acid powder | 80 ppm |
| 7 | Clean Water | — |

The concentration of the pollen polysaccharide is calculated by the concentration of crude polysaccharides.

4. Investigation Method
Treating agents are applied 3 times, the first time is before bagging of citrus, and then once a week, and an investigation is carried out after low temperature or when the clean water control shows obvious frost damage. All fruits are collected to investigate freezing rate and contents of malondialdehyde and proline in citrus leaves. The findings are shown in Table 29 and Table 30.

TABLE 29

Test concentration settings

| Treatment | Number of fruits investigated (Nr.) | Number of frosted fruits (Nr.) | Freezing rate (%) |
|---|---|---|---|
| 1 | 55 | 41 | 74.54 |
| 2 | 68 | 43 | 63.24 |
| 3 | 57 | 29 | 50.88 |
| 4 | 63 | 45 | 71.43 |
| 5 | 69 | 35 | 50.72 |
| 6 | 66 | 50 | 75.76 |
| 7 | 73 | 67 | 91.78 |

TABLE 30

Proline content of treatment groups

| No. | Proline content (%) | Proline variable (%) | Malondialdehyde content (umol/g) | Malondialdehyde variable (umol/g) |
|---|---|---|---|---|
| 1 | 0.381 | 0.038 | 0.044 | −0.009 |
| 2 | 0.405 | 0.062 | 0.028 | −0.025 |
| 3 | 0.397 | 0.054 | 0.032 | −0.021 |
| 4 | 0.372 | 0.029 | 0.045 | −0.008 |
| 5 | 0.401 | 0.058 | 0.031 | −0.022 |
| 6 | 0.374 | 0.031 | 0.046 | −0.007 |
| 7 | 0.343 | 0 | 0.053 | 0 |

It is clear from Table 29 that, without bagging, most citrus fruits in the clean water control are frosted, with a freezing rate of 91.78%. The spray of 1-8 ppm exogenous pollen polysaccharide can reduce the freezing rate of citrus fruits, of which 4 ppm pollen polysaccharide has the best effect, with a freezing rate of 50.88%, which has an effect close to the spray of 0.1 ppm 14-hydroxylated brassinosteroid (the freezing rate of citrus fruits is 50.72%), and is obviously superior to the control with clean water and the positive control with amino acid. It is clear from Table 30 that the spray of 1-8 ppm exogenous pollen polysaccharide can increase proline content and decrease malondialdehyde content of citrus leaves, and the treatment group with the best effect is consistent with the one with the lowest frostbite rate.

In conclusion, the spray of 1-8 ppm exogenous pollen polysaccharide can increase the accumulation of proline in citrus and reduce the production of malondialdehyde, so as to improve the cold resistance of citrus and reduce the freezing rate of citrus fruits, of which 4 ppm pollen polysaccharide has the best effect.

Embodiment 11

1. Material Required

Test: Bioactivity test of effect of the pollen polysaccharide on cold resistance of apple flower buds and fruits at low temperature Subjects: Fuji apple Experimental site: Wanrong County, Shanxi Province 2. Application Method Apple trees with similar growth are selected as test materials. Flower buds of apple trees usually germinate from March to April. If the temperature drops suddenly during this period, the flower buds will be frosted and the flowers will fall off, which will seriously affect the yield of apple trees. The application time in this test is the flowering period (Mar. 13, 2018) of apple trees. A total of 6 treatment groups are set up, with 3 trees for each treatment group. According to the experimental design, different treatment groups are sprayed with the pollen polysaccharide at corresponding concentrations, 14-hydroxylated brassinosteroid and compound amino acid powder are used as positive controls, and the blank control is sprayed with the same amount of clean water. The whole plants are sprayed until all leaves are wet without dripping. On Apr. 6, 2018, a low temperature freezing damage occurred, the ground temperature dropped to about −6° C., and the temperature below 0° C. lasted for more than 8 h. The pollen polysaccharide was sprayed three times before the cold wave, with an interval of 7 days. Unified water and fertilizer management was carried out. A branch with the same number of flower buds was selected in four directions of each tree in each treatment group for marking, and the number of flower buds on each branch was counted before the third application.

3. See Table 31 for treating agent design.

TABLE 31

| | Test concentration settings | |
|---|---|---|
| No. | Sample | Concentration of diluted pollen polysaccharide |
| 1 | Pollen polysaccharide extract | 2 ppm |
| 2 | Pollen polysaccharide extract | 4 ppm |
| 3 | Pollen polysaccharide extract | 8 ppm |
| 4 | 0.0075% 14-hydroxylated brassinosteroid aqueous solution | 0.1 ppm |
| 5 | 40% compound amino acid powder | 80 ppm |
| 6 | Clean Water | — |

The concentration of the pollen polysaccharide is calculated by the concentration of crude polysaccharides.

5. Investigation Method

After the cold wave (April 9), the total number of flower buds on the marked branches of each treatment group was counted when the temperature rose to calculate a bud falling rate. After fruitlets set (May 9), the number of fruits set on the marked branches was investigated to calculate a fruit setting rate.

Bud falling rate (%) =

$$\frac{\text{Number of flower buds before the cold wave} - \text{Number of flower buds after the cold wave}}{\text{Number of flower buds before the cold wave}} \times 100\%$$

Fruit setting rate (%)=number of fruits set/number of flower buds before cold wave×100%

The findings are shown in Table 32. The data in the table are the total number on all branches in each treatment group.

TABLE 32

| | Test concentration settings | | | | |
|---|---|---|---|---|---|
| Treatment | Number of flower buds before the cold wave | Number of flower buds after the cold wave | Bud falling rate (%) | Number of fruits set | Fruit setting rate (%) |
| 1 | 1037.00 | 721.00 | 30.47 | 66.00 | 6.36 |
| 2 | 1152.00 | 922.00 | 19.97 | 92.00 | 7.99 |
| 3 | 1291.00 | 973.00 | 24.63 | 75.00 | 5.81 |
| 4 | 1026.00 | 849.00 | 17.25 | 87.00 | 8.48 |
| 5 | 1102.00 | 691.00 | 37.30 | 68.00 | 6.17 |
| 6 | 1082.00 | 569.00 | 47.41 | 46.00 | 4.25 |

It is clear from Table 32 that flower buds of apple trees will be seriously damaged after a cold current during the flowering period without any protective measures, as a result, a large number of flowers fall, with a bud falling rate up to 47.41%, which also has some impact on later fruit setting. The spray of the pollen polysaccharide at different concentrations can enhance resistance of apple trees under adverse conditions, and reduce the bud falling rate to some extent. The spray of 4 ppm pollen polysaccharide can reduce the bud falling rate to 19.97%, and allow the fruit setting rate to reach 7.99%, which has an effect close to that of the positive control with 0.1 ppm 14-hydroxylated brassinosteroid, and is obviously superior to the control with clean water.

In conclusion, the spray of 2-8 ppm pollen polysaccharide before the cold wave can significantly reduce the damage of low temperature to flower buds and fruits of apple trees, reduce the bud falling rate and improve the fruit setting rate, of which 4 ppm pollen polysaccharide has the best effect.

The invention claimed is:

1. A pollen polysaccharide extract for promoting plant growth, wherein the pollen polysaccharide extract is prepared by the following method:
   (a) mixing rape pollen with water, and heating and stirring the rape pollen in water at a speed of 3000-4000 r/min at 60-70° C. for 3-5 h,
   (b) filtering,
   (c) adding chitosan to the filtrate to obtain a liquid to be clarified, wherein the chitosan in the liquid to be clarified has a chitosan concentration of 0.01-0.15 wt %,
   (d) keeping the liquid to be clarified at 60-80° C. for at least 1 h,
   (e) cooling said liquid and allowing to stand, and
   (f) performing solid-liquid separation to obtain a final liquid, which is the pollen polysaccharide extract for promoting plant growth.

2. The pollen polysaccharide extract according to claim 1, wherein the water is demineralized water.

3. The pollen polysaccharide extract according to claim 1, wherein the rape pollen and the water are mixed at a weight ratio of 1:1.5-5 in step (a).

4. The pollen polysaccharide extract according to claim 3, wherein the rape pollen and the water are mixed at a weight ratio of 1:2.

5. The pollen polysaccharide extract according to claim 1, wherein the chitosan in the liquid to be clarified has a concentration of 0.05-0.1 wt %.

6. The pollen polysaccharide extract according to claim 1, wherein the chitosan in the liquid to be clarified has a chitosan concentration of 0.08 wt %.

7. The pollen polysaccharide extract according to claim 1, wherein the liquid to be clarified is kept at 70° C. for 1 h.

8. A method of promoting the growth of roots of a plant, the method comprising:
   applying the pollen polysaccharide extract according to claim 1 to the roots of the plant.

9. A method of promoting the growth of roots of a wheat plant, the method comprising:
   applying the pollen polysaccharide extract according to claim 1 to the roots of the wheat plant.

10. A method of promoting the growth of plant stems and leaves, the method comprising:
    spraying the pollen polysaccharide extract according to claim 1 on the plant leaves, or
    applying the pollen polysaccharide extract according to claim 1 to the plant roots.

11. The method according to claim 10, wherein the plant is a vegetable or a fruit tree.

12. The method according to claim 11, wherein the plant is baby Chinese cabbage, asparagus lettuce, lettuce, Chinese cabbage, citrus tree, kiwi fruit tree, cherry tree or apple tree.

13. A pollen polysaccharide extract for promoting plant growth, wherein the pollen polysaccharide extract is prepared by the following method:
    (a) mixing rape pollen with water, and heating and stirring the rape pollen in water at a speed of 3000-4000 r/min at 60-70° C. for 3-5 h,
    (b) filtering,
    (c) mixing the filter residue obtained in step (b) with water, heating and stirring the filter residue in water at a speed of 3000-4000 r/min at 60-70° C. for 3-5 h, and filtering,
    (d) combining the filtrate of step (b) and the filtrate of step (c) to form a combined filtrate,
    (e) adding chitosan to the combined filtrate to obtain a liquid to be clarified, wherein the chitosan in the liquid to be clarified has a chitosan concentration of 0.01-0.15 wt %,
    (f) keeping the liquid to be clarified at 60-80° C. for at least 1 h,
    (g) cooling said liquid and allowing to stand, and
    (h) performing solid-liquid separation to obtain a final liquid, which is the pollen polysaccharide extract for promoting plant growth.

* * * * *